US011825055B2

(12) United States Patent
Wu

(10) Patent No.: US 11,825,055 B2
(45) Date of Patent: Nov. 21, 2023

(54) OPTICAL MODULE POSITIONING METHOD

(71) Applicant: PRIMAX ELECTRONICS LTD., Taipei (TW)

(72) Inventor: Kun-Lin Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 237 days.

(21) Appl. No.: 17/644,795

(22) Filed: Dec. 17, 2021

(65) Prior Publication Data

US 2023/0134966 A1    May 4, 2023

(30) Foreign Application Priority Data

Nov. 1, 2021    (TW) ................................ 110140580

(51) Int. Cl.
*H04N 1/387*      (2006.01)
*G02B 6/42*       (2006.01)

(52) U.S. Cl.
CPC ........... *H04N 1/387* (2013.01); *G02B 6/4292* (2013.01)

(58) Field of Classification Search
CPC .. H04N 1/387; H04N 2201/0432; H04N 1/04; G02B 6/4292
See application file for complete search history.

(56) References Cited

U.S. PATENT DOCUMENTS

2004/0021916 A1\*   2/2004   Sheng ................ H04N 1/00063
                                                      358/496
2019/0232697 A1\*   8/2019   Kayanaka .............. B41J 2/2117

\* cited by examiner

*Primary Examiner* — King Y Poon
*Assistant Examiner* — Michael L Burleson
(74) *Attorney, Agent, or Firm* — WPAT, P.C

(57) ABSTRACT

An optical module positioning method for an image processing device is provided. The image processing device includes a scanning platform and an optical module. The scanning platform includes a first region, a second region, a third region and a fourth region. The fourth region is arranged between the first region and the second region. The first region is arranged between the third region and the fourth region. The optical module positioning method includes the following steps. Firstly, the optical module is driven to perform a scanning operation to acquire a scanned image while the optical module is not moved. Then, by judging the color values of two ends of the scanned image, the region where the optical module is stayed can be recognized according to the associated color values.

22 Claims, 7 Drawing Sheets

OPTICAL MODULE POSITIONING METHOD

FIELD OF THE INVENTION

The present invention relates to an optical module positioning method, and more particularly to an optical module positioning method for realizing the stayed region of an optical module on a scanning platform according to color recognition when an image processing device is turned on and further moving the optical module back to a scan initial position.

BACKGROUND OF THE INVENTION

With the increasing development of image processing technologies, the applications of the image processing technologies are very popular to modern people. As is well known, image scanners are important peripheral devices of the computer system. The image scanners can be used for scanning documents. The images of the scanned documents can be converted into digital files. The digital files can be subjected to various image processing operations and applications. In other words, the image scanners are indispensable devices for the modern people to process images.

As known, a multifunction peripheral is a multifunctional image processing device. In addition to the general scanning function, the multifunction peripheral also has the printing, storing and transmitting functions. The multifunction peripheral is usually equipped with an automatic document feeder (ADF). The automatic document feeder is located over a placement platform. A single paper or sheet-like document can be placed on the placement platform in order to be scanned. After a stack of papers or sheet-like documents are placed on the automatic document feeder, the papers or sheet-like documents can be successively fed into the multifunction peripheral in order to be scanned. Consequently, the efficiency of the scanning task is enhanced.

The scanning mechanism of the placement platform and the scanning mechanism of the automatic document feeder are integrated into an optical module. During the scanning operation, the optical module projects a light beam to the document to be scanned. After the reflected light beam from the document is received, the scanned image of the document is acquired by the optical module. In case that the optical module or the document is not moved, the optical module is only able to scan a portion of the document. According to the structural design, the optical module is driven to be moved within the multifunction peripheral by a motor, or the document is fed by the automatic document feeder and simultaneously sensed by the optical module. Consequently, the complete image of the whole document can be acquired.

In order to accurately scan the image of the whole document, the optical module has to be stayed in the accurate position before the scanning operation is started. However, in some situations (e.g., the occurrence of a power failure event or an accidental shutdown event in the previous scanning operation), the scanning procedure is not normally completed. Since the optical module is not returned to the default initial position, the next scanning operation cannot be normally implemented.

For solving this problem, the image processing device is additionally equipped with a sensing element. When the image processing device is restarted or the power is restored, the optical module is returned back to the initial position regardless of the previous position. Moreover, the sensing element is used to detect whether the optical module is returned back to the accurate position. Generally, according to the structural design, the initial position is located near the automatic document feeder, and the sensing element is correspondingly located beside the initial position. After the image processing device is turned on and the scanning operation is completed, the optical module is moved toward the initial position. Until the sensing element detects the optical module, the motor is stopped. Consequently, the optical module is stayed in the initial position.

In other words, if the image processing device is not equipped with the sensing element, the image processing device is unable to realize whether the optical module is accurately returned to the initial position. Moreover, if the sensing element is not used, the optical module may be excessively moved to collide with the casing. Consequently, the optical module is possibly damaged. However, except for the function of detecting whether the optical module is accurately stayed in the initial position before the scanning operation, the sensing element has no other functions. When compared with the scanning mechanism, the printing mechanism or other components of the image processing device, the applicability of the sensing element is not high enough. In addition, the sensing element is not cost-effective. If the sensing element is damaged and needs to be replaced with a new one, the material cost is increased and the process of assembling the sensing element is labor-intensive and time-consuming.

Therefore, there is a need of providing an optical module positioning method for accurately confirming the position of the optical module and successfully completing the scanning operation without the need of installing the sensing element.

SUMMARY OF THE INVENTION

The present invention provides an optical module positioning method. When the optical module positioning method is applied to an image processing device such as a multifunction peripheral, the image processing device can realize the stayed region of the optical module on the scanning platform according to color recognition when the image processing device is turned on. Moreover, the optical module can be returned to the initial position before the scanning operation is started. Especially, the image processing device is not equipped with the sensing element. The use of the optical module positioning method can effectively avoid the collision between the optical module and the casing.

In accordance with an aspect of the present invention, an optical module positioning method for an image processing device is provided. The image processing device includes a scanning platform and an optical module. The scanning platform includes a first region, a second region, a third region and a fourth region. The fourth region is arranged between the first region and the second region. The first region is arranged between the third region and the fourth region. An initial position is included in the third region. A length of the fourth region is larger than a length of the third region. The optical module positioning method includes the following steps. Firstly, the optical module is driven to perform a scanning operation to acquire a scanned image while the optical module is not moved. If a color value of a first end of the scanned image and a color value of a second end of the scanned image are in a first color range or a second color range, it is determined that the optical module is stayed in the third region. If the color value of the first end of the scanned image is in a third color range and the color value of the second end of the scanned image is in the second color range, it is determined that the optical module is stayed in the first region. If the color value of the first end of the scanned image is in the second color range and the color value of the second end of the scanned image is in a fourth color range, it is determined that the optical module is stayed in the second region. If the color value of the first end of the scanned image and the color value of the second end of the scanned image are in the fourth color range, it is determined that the optical module is stayed in the fourth region.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
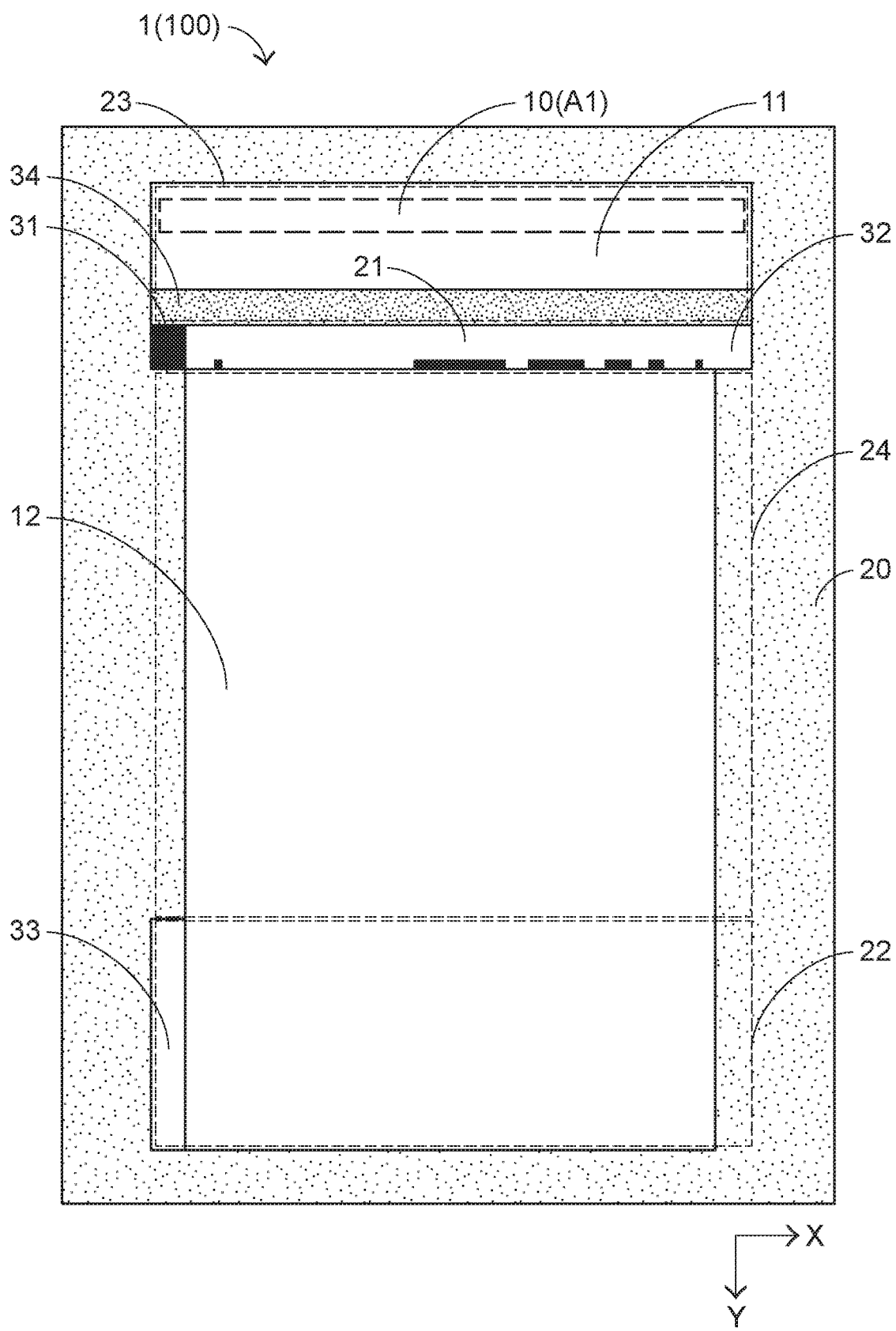
FIG. 1 schematically illustrates an image processing device using an optical module positioning method of the present invention.

The present invention provides an optical module positioning method. An example of the optical module positioning method will be described as follows. FIG. 1 schematically illustrates an image processing device using an optical module positioning method of the present invention. In this embodiment, the image processing device 1 is an image scanner. More especially, the image processing device 1 is a multifunctional peripheral with a scanning function and an automatic document feeding function. As shown in FIG. 1, the image processing device 1 comprises a scanning platform 100 and an optical module 10. The optical module 10 is located under the scanning platform 100 for performing the image scanning operation. For clearly describing the concepts of the present invention, only the internal structure of the image processing device 1 and the scanning platform 100 are shown in FIG. 1. In addition, only the portion of a scanning head of the optical module 10 for scanning the document is shown in FIG. 1 and indicated as dashed lines.

In accordance with a feature of the present invention, a middle area of the scanning platform 100 is divided into four regions. That is, the scanning platform 100 comprises a first region 21, a second region 22, a third region 23 and a fourth region 24. An initial position A1 corresponding to the starting position of the scanning operation (i.e., the position of the optical module 10 as shown in FIG. 1) is included in the third region 23. The fourth region 24 is arranged between the first region 21 and the second region 22. The first region 21 is arranged between the third region 23 and the fourth region 24. In other words, the third region 23 is the closest to the initial position A1. The second region 22 is the farthest from the initial position A1.

In an embodiment, the scanning platform 100 further comprises a casing 20, a separation part 34, a first scanning glass plate 11 and a second scanning glass plate 12. The first scanning glass plate 11 and the second scanning glass plate 12 are enclosed by the casing 20. The separation part 34 is arranged between the first scanning glass plate 11 and the first region 21. The first scanning glass plate 11 is aligned with the third region 23 and an automatic document feeder (ADF) of the image processing device 1. For succinctness, the automatic document feeder is not shown. That is, the first scanning glass plate 11 is related to the scanning application in the automatic document feeding mode. In addition, the first scanning glass plate 11 is aligned with a document press chart (not shown) of the image processing device 1. The document press chart is installed on a top cover (not shown) of the image processing device 1. The top cover can be selectively uplifted from the scanning platform 100 or moved downwardly to cover the scanning platform 100. When the scanning platform 100 is covered by the top cover, the ambient light can be sheltered. In other words, the document press chart is located over the first scanning glass plate 11, and the size of the document press chart matches the size of the first scanning glass plate 11. When the document press chart is moved downwardly to cover the scanning platform 100, the document press chart is completely aligned with the first scanning glass plate 11. The second scanning glass plate 12 is aligned with the fourth region 24 and the second region 22. That is, a single paper or sheet-like document can be placed on the second scanning glass plate 12 so as to be scanned.

Particularly, the second region 22, the third region 23 and the fourth region 24 are virtual regions, but the first region 21 is a physical region defined by an object. In addition, the first region 21 is installed on the casing 20 and located beside the second scanning glass plate 12. The first scanning glass plate 11 and the separation part 34 are included in the third region 23. Moreover, the fourth region 24 contains a portion of the second scanning glass plate 12 and portions of the casing 20 corresponding to two ends of the second scanning glass plate 12.

Please refer to FIG. 1 again. The initial position A1 is located at a first side of the third region 23. The separation part 34 is located at a second side of the third region 23. That is, the initial position A1 and the separation part 34 are located at two opposite sides of the third region 23, respectively. The distance between the initial position A1 and the first region 21 can be previously set as a known distance. Depending on the actual fabricating method, the initial position A1 is completely attached on the first side of the third region 23, or there is a small distance between the initial position A1 and the first side of the third region 23.

In an embodiment, the length of the fourth region 24 is larger than the length of the third region 23, and the length of the fourth region 24 is also larger than the length of the second region 22. In addition, the length of the second region 22 is larger than the length of the third region 23. The overall profile of the third region 23, the first region 21, the fourth region 24 and the second region 22 has a rectangular shape. In other words, the widths of the third region 23, the first region 21, the fourth region 24 and the second region 22 are equal. Accordingly, the area of the fourth region 24 is the largest, the area of the second region 22 is the second largest, the area of the third region 23 is the third largest, and the area of the first region 21 is the smallest. In this context, the lengths are related to the distances along the Y direction as shown in FIG. 1, and the widths are related to the distances along the X direction as shown in FIG. 1.

For implementing the optical module positioning method of the present invention, the scanning width of the optical module 10 is equal to the width of each of the first region 21, the second region 22, the third region 23 and the fourth region 24. Moreover, as shown in FIG. 1, the position of the optical module 10 is substantially center-aligned with all of the four regions 21, 22, 23 and 24. In other words, while the optical module 10 is moved relative to the scanning platform 100 to perform the scanning operation, the two ends of the optical module 10 are respectively aligned with the two ends of each of the four regions 21, 22, 23 and 24. Consequently, the two ends of each of the four regions 21, 22, 23 and 24 can be scanned by the optical module 10. In an embodiment, the scanning width of the optical module 10 is equal to the width of the first scanning glass plate 11. That is, the scanning width of the optical module 10 is also equal to the width of the separation part 34. Moreover, the scanning width of the optical module 10 is larger than the width of the second scanning glass plate 12. In other words, the width of the second scanning glass plate 12 is smaller than the width of the first scanning glass plate 11.

In accordance with another feature of the present invention, the scanning platform 100 comprises plural characteristic charts. For example, the scanning platform 100 comprises a first characteristic chart 31, a second characteristic chart 32 and a third characteristic chart 33. These characteristic charts are formed on the casing 20. In the embodiment of FIG. 1, the first characteristic chart 31 and the second characteristic chart 32 are respectively formed located at two ends of the first region 21, and the third characteristic chart 33 is located at an end of the second region 22. For example, as shown in FIG. 1, the first characteristic chart 31 is located at the left end of the first region 21, the second characteristic chart 32 is located at the right end of the first region 21, and the third characteristic chart 33 is located at the left end of the second region 22. Moreover, the second region 22 contains the third characteristic chart 33, a portion of the second scanning glass plate 12 and a portion of the casing 20 corresponding to the right end of the second scanning glass plate 12.

In an embodiment, these characteristic charts 31, 32 and 33 have specified colors. Preferably, these characteristic charts are monochromatic charts, and the contrast between these monochromatic charts is high. Due to this design, the scan recognition efficacy is enhanced. For example, the first characteristic chart 31 is a black chart, and the second characteristic chart 32 and the third characteristic chart 33 are white charts. That is, the colors of the characteristic charts 31 and 32 at the two ends of the first region 21 are different. Although the second characteristic chart 32 and the third characteristic chart 33 are white, the second characteristic chart 32 and the third characteristic chart 33 are diagonally arranged at two opposite sides. Moreover, the casing 20 and the separation part 34 are monochromatic. Especially, the colors of the casing 20 and the separation part 34 are different from the colors of theses characteristic charts 31, 32 and 33. For example, the casing 20 has a light gray color, and the separation part 34 has a dark gray color. Moreover, the document press chart is also monochromatic. In order to avoid the influence of the document press chart on the scanned result, the document press chart has a white color.

Please refer to FIG. 1 again. In this embodiment, the widths of the characteristic charts 31, 32 and 33 are equal. During the scanning operation, the widths of the characteristic charts 31, 32 and 33 are aligned with the two ends of the optical module 10. Moreover, the total width of the first characteristic chart 31, the second scanning glass plate 12 and the second characteristic chart 32 is equal to the scanning width of the optical module 10. In an embodiment, each of the two ends of the optical module 10 is designed to scan a specified number of pixels. The specified number of pixels is equal to or slightly smaller than the width of each of the characteristic charts 31, 32 and 33. Especially, the widths of the characteristic charts 31, 32 and 33 are designed to fill in or trim the width gap between the first scanning glass plate 11 and the second scanning glass plate 12.

Due to the above design, the following functions can be achieved. Even if the image processing device is not equipped with the sensing element, the position of the optical module 10 can be realized. For example, when the optical module 10 is in a ready-to-scan status, in an incomplete scanning status, in a restart status after power failure or in any other possible status, the position of the optical module 10 in one of the four regions 21, 22, 23 and 24 can be realized. Consequently, a preliminary classification about the position of the optical module 10 can be made.

Figure 2:
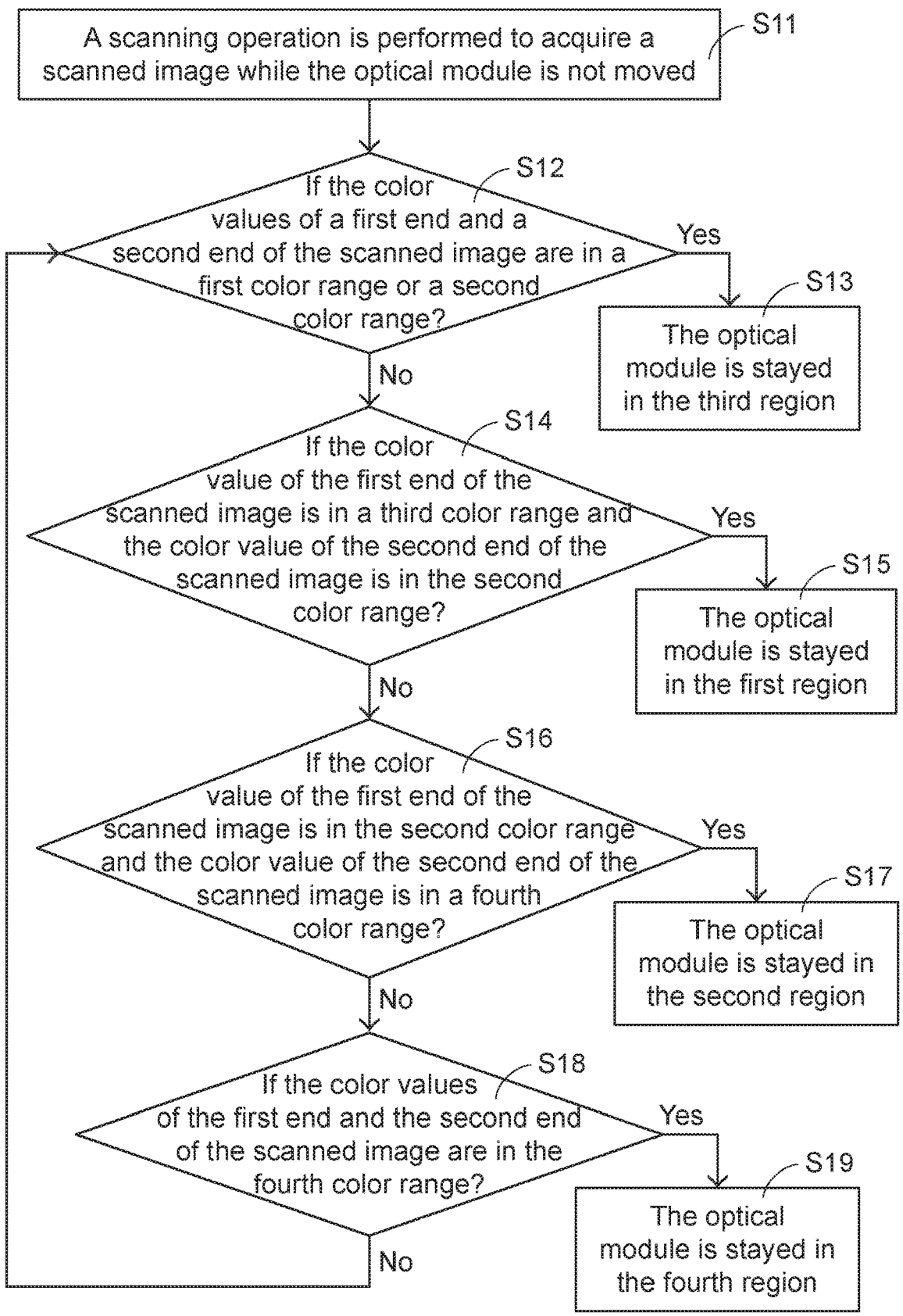
FIG. 2 is a flowchart illustrating a region judgment process of the optical module positioning method according to the embodiment of the present invention.

FIG. 2 is a flowchart illustrating a region judgment process of the optical module positioning method according to the embodiment of the present invention. Firstly, a scanning operation is performed to acquire a scanned image while the optical module 10 is not moved (Step S11). Then, a step S12 is performed to judge whether the color values of a first end and a second end of the scanned image are in a first color range or a second color range. If the judging condition of the step S12 is satisfied, it is determined that the optical module 10 is stayed in the third region 23 (Step S13). Whereas, if the judging condition of the step S12 is not satisfied, a step S14 is performed to judge whether the color value of the first end of the scanned image is in a third color range and the color value of the second end of the scanned image is in the second color range. If the judging condition of the step S14 is satisfied, it is determined that the optical module 10 is stayed in the first region 21 (Step S15). Whereas, if the judging condition of the step S14 is not satisfied, a step S16 is performed to judge whether the color value of the first end of the scanned image is in the second color range and the color value of the second end of the scanned image is in a fourth color range. If the judging condition of the step S16 is satisfied, it is determined that the optical module 10 is stayed in the second region 22 (Step S17). Whereas, if the judging condition of the step S16 is not satisfied, a step S18 is performed to judge whether the color values of the first end and the second end of the scanned image are in the fourth color range. If the judging condition of the step S18 is satisfied, it is determined that the optical module 10 is stayed in the fourth region 24 (Step S19).

In the step S11, regardless of the position of the optical module 10 in the ready-to-scan status, in the incomplete scanning status or in the restart status after power failure, the optical module 10 performs the scanning operation once in situ in the beginning. That is, the optical module 10 performs the scanning operation while the optical module 10 is not moved. The purpose of this design can avoid the damage of the optical module 10. For example, the optical module 10 is possibly located at any position after the previous operation is stopped. If the optical module 10 is moved forth or back after being enabled, the possibility of causing the optical module 10 to collide with the internal side of the casing 20 increases. The in-situ scanning operation of the optical module 10 can avoid the above problem.

In accordance with a feature of the present invention, the color-related region where the optical module 10 is stayed can be determined according to the scanned result of judging and recognizing the two ends of the scanned image (i.e., the color values). According to the characteristic charts 31, 32 and 33, the separation part 34 and the distribution of the regions 21, 22, 23 and 24, it is found that the colors of the two ends of the fourth region 24 are identical and the colors of the two ends of each of the first region 21 and the second region 22 are different. The different colors indicate that there is an obvious contrast between two colors. In case that the optical module 10 is stayed in the fourth region 24, the color values of the two ends of the scanned image are equal because the two ends of the fourth region 24 have the light gray color corresponding to the casing 20. Since the document press chart has the white color, the result of scanning the document press chart through the first scanning glass plate 11 by the optical module 10 is also white. In case that the optical module 10 is stayed in the third region 23, both of the two ends of the scanned image have the same white color corresponding to the document press chart or the same dark gray color corresponding to the separation part 34.

However, the scanned result of the optical module 10 on the image usually has an error. That is, there is possibly a slight color level difference. For example, after a pure white or pure black chart is scanned, the scanned result is possibly not pure white or pure black. In the above embodiment, the associated color range represents the judgement allowance. In addition, each color range may be a color level setting of the related color within a specific value range. Particularly, if the color value of the scanned image is in the corresponding color range, it means that the corresponding color chart is scanned by the optical module 10.

As mentioned above, if the judging result indicates that the colors of the two ends of the scanned image are identical, it means that the optical module 10 is possibly stayed in the third region 23 or the fourth region 24. Whereas, if the judging result indicates that that colors of the two ends of the scanned image are different, it means that the optical module 10 is possibly stayed in the second region 22 or the first region 21. Consequently, the scanned result can be further judged according to the associated color range.

In the steps S12 and S13, the first color range is related to the color value of the dark gray color, and the second color range is related to the color value of the white color. In other words, the first color range is an allowable range of successfully recognizing the scanned result of the dark gray image. The scanned result with the color slightly darker than or lighter than the dark gray color may be considered as the dark gray color that complies with the first color range. In addition, the second color range is an allowable range of successfully recognizing the scanned result of the white image. The scanned result with the color slightly darker than the pure white color may be considered as the white color that complies with the second color range.

Consequently, if the judging result indicates that the two ends of the scanned image have the dark gray color, it means that the separation part 34 with the dark gray color is scanned by the optical module 10. Moreover, if the judging result indicates that the two ends of the scanned image have the white color, it means that the document press chart with the white color is scanned by the optical module 10. In these two situations, it is determined that the optical module 10 is stayed in the third region 23. If the judging condition of the step S12 is not satisfied, i.e., the color values of the first end and the second end of the scanned image are not in the first color range or the second color range, the scanned result is further judged according to other conditions.

In the steps S14 and S15, the third color range is related to the color value of the black color, and the second color range is related to the color value of the white color. In other words, the third color range is an allowable range of successfully recognizing the scanned result of the black image. The scanned result with the color slightly lighter than the pure black color may be considered as the black color that complies with the third color range. In addition, the second color range is an allowable range of successfully recognizing the scanned result of the white image. The scanned result with the color slightly darker than the pure white color may be considered as the white color that complies with the second color range. In the example of FIG. 1, the first end of the scanned image is the left end of the scanned image corresponding to the first characteristic chart 31, and the second end of the scanned image is the right end of the scanned image corresponding to the second characteristic chart 32.

Consequently, if the judging result indicates that the color value of the first end (i.e., the left end) of the scanned image represents the black color and the color value of the second end (i.e., the right end) of the scanned image represents the white color, it means that the first characteristic chart 31 with the black color is scanned by the left end of the optical module 10 and the second characteristic chart 32 with the white color is scanned by the right end of the optical module 10. Under this circumstance, it is determined that the optical module 10 is stayed in the first region 21. If the judging condition of the step S14 is not satisfied, i.e., the color value of the left end of the scanned image is not in the third color range or the color value of the right end of the scanned image is not in the second color range, the scanned result is further judged according to other conditions.

In the steps S16 and S17, the second color range is related to the color value of the white color, and the fourth color range is related to the color value of the light gray color. In other words, the second color range is an allowable range of successfully recognizing the scanned result of the white image. The scanned result with the color slightly darker than the pure white color may be considered as the white color that complies with the second color range. In addition, the fourth color range is an allowable range of successfully recognizing the scanned result of the light gray image. The scanned result with the color slightly darker than or slightly lighter than the light gray color may be considered as the light gray color that complies with the fourth color range. In the example of FIG. 1, the first end of the scanned image is the left end of the scanned image corresponding to the third characteristic chart 33, and the second end of the scanned image is the right end of the scanned image corresponding to the casing 20.

Consequently, if the judging result indicates that the color value of the first end (i.e., the left end) of the scanned image represents the white color and the color value of the second end (i.e., the right end) of the scanned image represents the light gray color, it means that the third characteristic chart 33 with the white color is scanned by the left end of the optical module 10 and the casing 20 with the light gray color is scanned by the right end of the optical module 10. Under this circumstance, it is determined that the optical module 10 is stayed in the second region 22. If the judging condition of the step S16 is not satisfied, i.e., the color value of the left end of the scanned image is not in the second color range or the color value of the right end of the scanned image is not in the fourth color range, the scanned result is further judged according to other conditions.

In the steps S18 and S19, the fourth color range is related to the color value of the light gray color. In other words, the fourth color range is an allowable range of successfully recognizing the scanned result of the light gray image. The scanned result with the color slightly darker than or slightly lighter than the light gray color may be considered as the light gray color that complies with the fourth color range.

Consequently, if the judging result indicates that the color values of the left end and the right end of the scanned image represent the light gray color, it means that the casing 20 with the light gray color are scanned by the left end and the right end of the optical module 10. Under this circumstance, it is determined that the optical module 10 is stayed in the fourth region 24. If the judging condition of the step S18 is not satisfied, i.e., the color values of the two ends of the scanned image are not in the fourth color range, the step S12 is performed again to repeat the judging procedure.

As mentioned above, the optical module 10 in the initial status is possibly stayed in any region. Consequently, the sequence of the judging steps S12, S14, S16 and S18 may be adjusted in other embodiments. That is, the sequence of these judging conditions is not restricted. In most situations, the position where the optical module 10 can be recognized by referring to the colors of the characteristic charts 31, 32, 33, the separation part 34, the document press chart and the casing 20 after the judging steps S12, S14, S16 and S18 are completed.

As mentioned above, the optical module 10 in the initial status is possibly stayed in any region. Moreover, in some situations, the optical module 10 is possibly spanned across two regions. Under this circumstance, the above judging conditions need to be modified. For example, in some embodiments, the judging conditions of the steps S12, S14, S16 and S18 are related to the judgment and identification about the color values of the two ends of the first scan line of the scanned image. That is, the region where the optical module 10 is stayed is only determined according to the region of the first scan line of the scanned image.

From the above descriptions, even if the image processing device is not equipped with the sensing element, the optical module positioning method of the present invention can realize the region where the optical module 10 is stayed. In accordance with another feature of the present invention, even if the image processing device is not equipped with the sensing element, the optical module 10 can be accurately moved back to the initial position A1 after the stayed region of the optical module 10 is realized. In other words, after the judging result of the step S13, S15, S17 or S19 recognizes the stayed region of the optical module 10, the optical module 10 is moved back to the initial position A1 according to the designated flowchart. The method of moving the optical module 10 from the stayed region to the initial position A1 will be described as follows.

Figure 3:
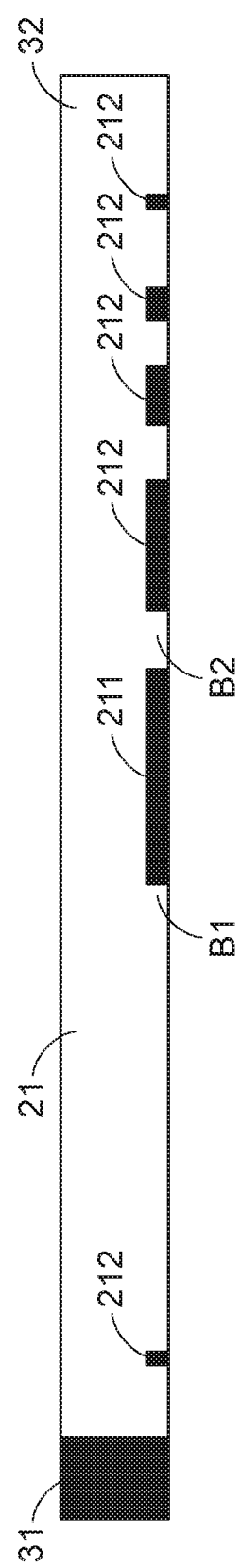
FIG. 3 schematically illustrates the detailed arrangement of the first region of the scanning platform according to an embodiment of the present invention.

FIG. 3 schematically illustrates the detailed arrangement of the first region of the scanning platform according to an embodiment of the present invention. The first region 21 contains a main characteristic chart 211 and plural minor characteristic charts 212. In this embodiment, the area of the main characteristic chart 211 is larger than the area of each of the plural minor characteristic charts 212. The areas of the plural minor characteristic charts 212 are different. The main characteristic chart 211 is substantially located at a middle position of the first region 21. Moreover, the main characteristic chart 211 and the plural minor characteristic charts 212 are located at the side of the first region 21 adjacent to the fourth region 24. That is, the main characteristic chart 211 and the plural minor characteristic charts 212 are located at the bottom side of the first region 21 and close to the fourth region 24.

The main characteristic chart 211 has a main characteristic width. Each of the minor characteristic charts 212 has a minor characteristic width. The thicknesses of the main characteristic chart 211 and the plural minor characteristic charts 212 are identical. Since the main characteristic chart 211 is larger, the main characteristic width is larger than each minor characteristic width. In addition, the distance between each of the main characteristic chart 211 and the plural minor characteristic charts 212 and the initial position A1 is known. In this embodiment, the main characteristic chart 211 and plural minor characteristic charts 212 have the same color (e.g., a black color). Except for the first characteristic chart 31, the main characteristic chart 211 and the plural minor characteristic charts 212, the rest of the first region 21 has the white color.

Figure 4:
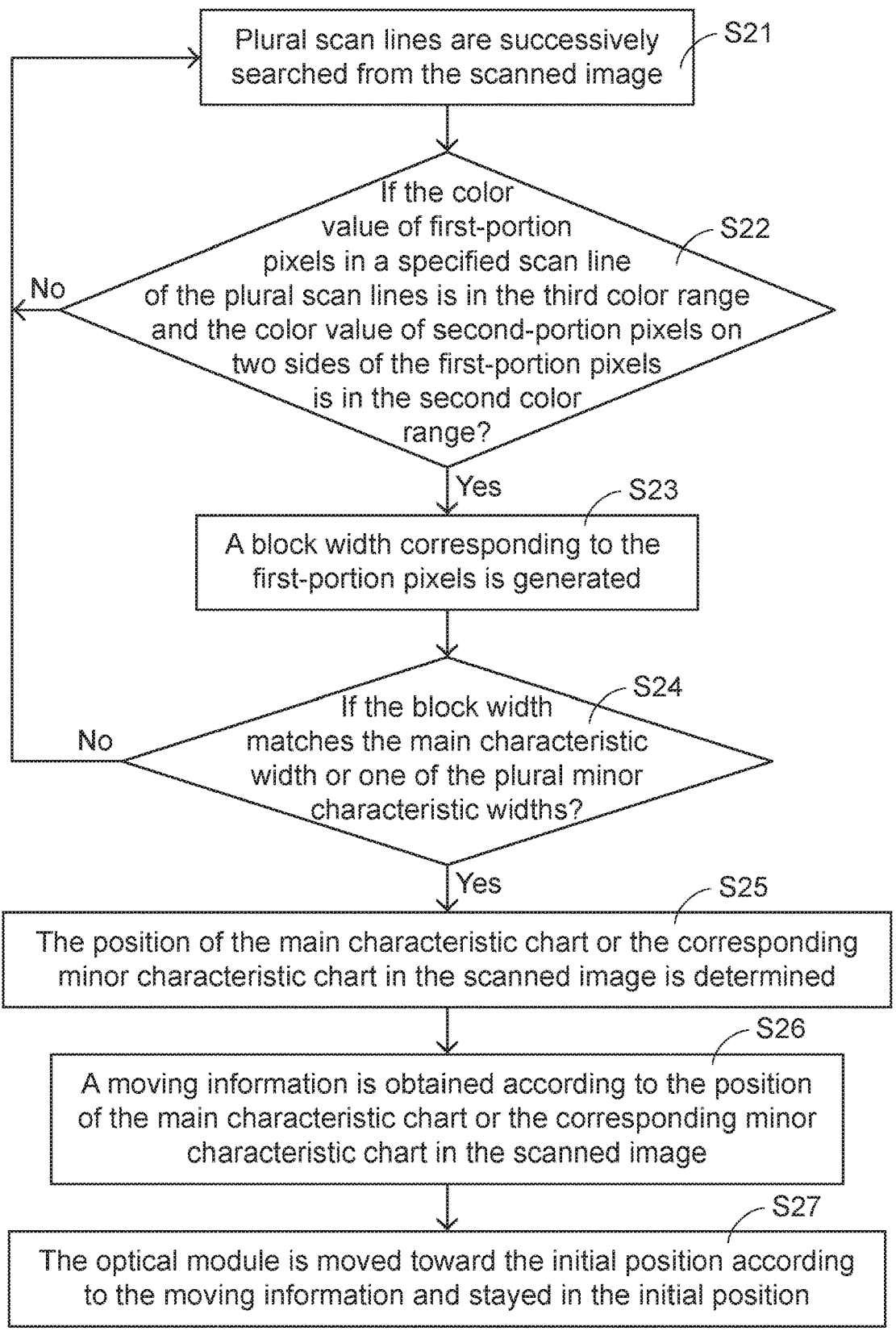
FIG. 4 is a flowchart illustrating the optical module positioning method of the present invention after the optical module is determined to be stayed in the first region.

FIG. 4 is a flowchart illustrating the optical module positioning method of the present invention after the optical module is determined to be stayed in the first region 21. Firstly, plural scan lines are successively searched from the scanned image (Step S21). Then, a step S22 is performed to judge whether the color value of first-portion pixels in a specified scan line of the plural scan lines is in the third color range and the color value of second-portion pixels on two sides of the first-portion pixels is in the second color range. If the judging condition of the step S22 is satisfied, a block width corresponding to the first-portion pixels is generated (Step S23). Then, a step S24 is performed to judge whether the block width matches the main characteristic width or one of the plural minor characteristic widths. If the judging condition of the step S24 is satisfied, the position of the main characteristic chart 211 or the corresponding minor characteristic chart 212 in the scanned image is determined (Step S25). That is, if the block width matches the main characteristic width, the position of the main characteristic chart 211 in the scanned image is determined. Moreover, if the block width matches one of the plural minor characteristic widths, the position of the corresponding minor characteristic chart 212 in the scanned image is determined. Then, a moving information is obtained according to the position of the main characteristic chart 211 or the corresponding minor characteristic chart 212 in the scanned image (Step S26). Then, the optical module 10 is moved toward the initial position A1 according to the moving information and stayed in the initial position A1 (Step S27).

In the step S21, the acquired scanned image (not shown) is an image composed of plural horizontal scan lines. In this stage, the plural scan lines are successively recognized. Consequently, the pixel arrangement to form the scanned image can be realized. In this embodiment, the plural scan lines are successively recognized and searched from top to bottom. That is, the scan line closest to the initial position A1 is recognized and searched at first, and then the other scan lines are successively recognized and searched from top to bottom (i.e., along the Y direction as shown in FIG. 1). Among the four regions, the first region 21 is the shortest. In addition, the width of the first region 21 is equal to the scanning width of the optical module 10. Consequently, if the optical module 10 is stayed in the first region 21 in the beginning, the scanned image acquired by the optical module 10 through the in-situ scanning operation may contain the entire image of the first region 21, or the scanned image may at least contain the images of the main characteristic chart 211 and the minor characteristic charts 212.

In the step S22, the plural scan lines are searched successively. Consequently, the portion of the first region 21 with the white color is first searched. At this moment, the first end (i.e., the left end) of the scanned image is aligned with the first characteristic chart 31. However, only the right side of the first characteristic chart 31 has the white color. In other words, the first characteristic chart 31 does not match the feature of the main characteristic chart 211 or the minor characteristic charts 212. Consequently, the first characteristic chart 31 is not recognized as the main characteristic chart 211 or one of the minor characteristic charts 212.

During the searching process, if the first-portion pixels (especially the middle portion of the scanned image) in the specified scan line have the black color and the second-portion pixels on two sides of the first-portion pixels (i.e., the blank portions B1 and B2 beside the main characteristic chart 211 or the minor characteristic charts 212) have the white color, the white-black-white arrangement is recognized. Under this circumstance, the main characteristic chart 211 or the minor characteristic charts 212 have been searched. The first scan line with the white-black-white arrangement is equivalent to the topmost edge of the main characteristic chart 211 or the minor characteristic charts 212. The ways of judging whether the associated color values are in the third color range and the second color range are similar to those of the flowchart as described in FIG. 2, and not redundantly described herein. If the judging condition of the step S22 is not satisfied, the step S21 is performed again.

For further confirming whether the searched object is the main characteristic chart 211 or the minor characteristic chart 212 in the step S23, the pixels complying with the judging condition of the step S22 are processed. That is, the range of the black first-portion pixels is calculated, and thus the block width is obtained. Particularly, after the positions of the two sides of the first-portion pixels (i.e., the black block) are confirmed, the distance between the two sides of the first-portion pixels can be determined as the block width.

In the step S24, the main characteristic width of the main characteristic chart 211 is known, and the minor characteristic width of each minor characteristic chart 212 is known. By comparing the block width of the first-portion pixels (i.e., the black block) with the main characteristic width and each minor characteristic width, the first-portion pixels (i.e., the black block) can be recognized. In case that the block width matches the main characteristic width, the first-portion pixels (i.e., the black block) represent the main characteristic chart 211. In case that the block width matches one of the plural minor characteristic widths, the first-portion pixels (i.e., the black block) represent the corresponding minor characteristic chart 212. Moreover, when the two widths are equal to each other or the two widths with a small width difference due to the scanning error, it is determined that the two widths match each other.

In the step S25, the pixels complying with the judging condition of the step S24 are processed. That is, the position of the main characteristic chart 211 or the corresponding minor characteristic chart 212 represented by the first-portion pixels (i.e., the black block) in the scanned image is recognized. Particularly, after the main characteristic chart 211 or the corresponding minor characteristic chart 212 related to a specified horizontal scan line of the scanned image is recognized, the position of the main characteristic chart 211 or the corresponding minor characteristic chart 212 in the scanned image is determined. After calculation, the actual position of the optical module 10 in the scanning platform 100 can be realized.

In the above embodiment, the plural scan lines are successively searched from top to bottom. It is noted that numerous modifications and alterations may be made while retaining the teachings of the invention. For example, in another embodiment, the plural scan lines are successively searched from bottom to top. That is, the plural scan lines of the scanned image are successively and upwardly searched from the bottommost scan line. As mentioned above, the thicknesses of the main characteristic chart 211 and the plural minor characteristic charts 212 are known. That is, the number of scan lines corresponding to the thickness is known. Consequently, the accurate position can be realized through calculation.

After the position of the main characteristic chart 211 or the corresponding minor characteristic chart 212 is determined, the step S26 and S27 are performed. Meanwhile, the linear distance between the optical module 10 and the main characteristic chart 211 or the corresponding minor characteristic chart 212 can be realized. Since the distance between the main characteristic chart 211 and the initial position A1 and the distance between the corresponding minor characteristic chart 212 and the initial position A1 are known fixed values, the distance between the current position of the optical module 10 and the initial position A1 is also known. Consequently, the moving information is related to the distance between the current position of the optical module 10 and the initial position A1. According to the moving information, the optical module 10 is driven to be accurately moved back to the initial position A1.

Figure 5:
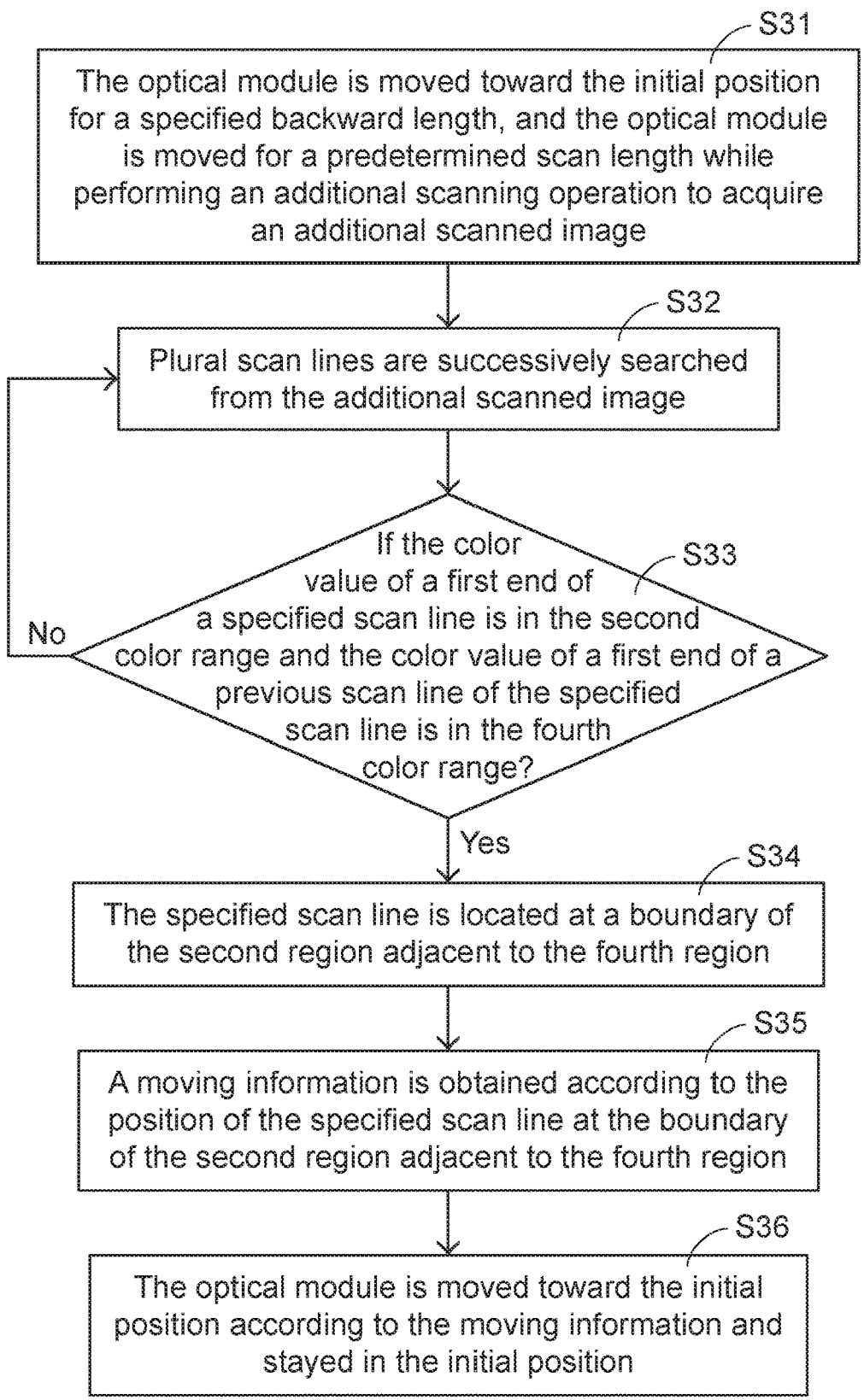
FIG. 5 is a flowchart illustrating the optical module positioning method of the present invention after the optical module is determined to be stayed in the second region.

FIG. 5 is a flowchart illustrating the optical module positioning method of the present invention after the optical module is determined to be stayed in the second region. Firstly, the optical module 10 is moved toward the initial position A1 for a specified backward length, and the optical module 10 is moved for a predetermined scan length while performing an additional scanning operation to acquire an additional scanned image (Step S31). Then, plural scan lines are successively searched from the additional scanned image (Step S32). Then, a step S33 is performed to judge whether the color value of a first end of a specified scan line is in the second color range and the color value of a first end of a previous scan line of the specified scan line is in the fourth color range. If the judging condition of the step S33 is satisfied, it is determined that the specified scan line is located at a boundary of the second region 22 adjacent to the fourth region 24 (Step S34). Then, a moving information is obtained according to the position of the specified scan line at the boundary of the second region 22 adjacent to the fourth region 24 (Step S35). Then, the optical module 10 is moved toward the initial position A1 according to the moving information and stayed in the initial position A1 (Step S36).

The flowchart of FIG. 5 is designed to search the junction between the second region 22 and the fourth region 24. Particularly, the line passing through the topmost edge of the third characteristic chart 33 represents the junction between the second region 22 and the fourth region 24. As mentioned above, the third characteristic chart 33 has a white color. The color of the third characteristic chart 33 is different from the light gray color of the casing 20 on the upper side of the third characteristic chart 33 (i.e., the left end of the fourth region 24). In other words, the junction can be recognized according to the color difference. After the junction between the second region 22 and the fourth region 24 is searched, the junction between the third characteristic chart 33 and the casing 20 on the upper side can be searched.

In the step S31, the optical module 10 is moved backwardly toward the initial position A1. Particularly, the optical module 10 has to be moved back to the fourth region 24. In such way, the junction between the second region 22 and the fourth region 24 can be searched successfully. As mentioned above, the fourth region 24 is the longest among the four regions. Consequently, the maximum of the backward length is set as the length of the second region 22. Even if the optical module 10 is located at the bottommost side of the second region 22 in the beginning, the optical module 10 can be moved back for the length equal to the second region 22 (i.e., the maximum of the backward length) because the optical module 10 has the inherent thickness. In this way, the optical module 10 is certainly moved to the fourth region 24.

Then, the optical module 10 is driven to be moved for the predetermined scan length along the Y direction as shown in FIG. 1. That is, the moving action and the scanning operation of the optical module 10 are simultaneously performed. According to the settings of this embodiment, the maximum of the predetermined scan length is equal to a total length of the third region 23 and the first region 21, and the total length of the third region 23 and the first region 21 is smaller than the length of the second region 22. The optical module 10 is moved backwardly to the fourth region 24. Ideally, the optical module 10 is moved backwardly to the position near the bottommost side of the fourth region 24. In case that the predetermined scan length is equal to a total length of the third region 23 and the first region 21, and the optical module 10 is moved for the predetermined scan length to perform the additional scanning operation. Meanwhile, the junction between the third characteristic chart 33 and the casing 20 on the upper side of the third characteristic chart 33 is still contained in the additional scanned image, and the portion of the casing 20 on the lower side of the third characteristic chart 33 is not collided by the optical module 10.

In an embodiment, a pixel averaging method is used to process the additional scanned image. While the optical module 10 is moved, several scan lines of the additional scanned image are combined as a scan line unit, and the mean pixel value of the scan line unit is calculated. That is, the number of scan lines to be recognized is reduced. Consequently, the image processing time and the calculation time are reduced. For example, in case that the additional scanned image has 200 scan lines, every 10 scan lines are combined as a scan line unit, and the mean pixel value of the 10 scan lines of the scan line unit is calculated. In other words, only 20 scan line units need to be recognized. Consequently, the image processing time and the calculation time are reduced.

Similarly, in the step S32, the additional scanned image (not shown) is an image composed of plural scan lines. In this stage, the plural scan lines are successively recognized. Consequently, the pixel arrangement to form the additional scanned image can be realized. In this embodiment, the plural scan lines are successively recognized and searched from top to bottom.

Similarly, in the step S33, the first end of the corresponding scan line is aligned with the left end of the third characteristic chart 33 along the direction of FIG. 1. The second color range is an allowable range of successfully recognizing the scanned result of the white image while the optical module 10 performs the additional scanning operation. The fourth color range is an allowable range of successfully recognizing the scanned result of the light gray image while the optical module 10 performs the additional scanning operation.

If the color value of the first end (i.e., the left end) of a specified scan line (e.g., the n-th scan line) represents the white color and the color value of the first end (i.e., the left end) of the previous scan line (e.g., the (n−1)-th scan line) of the specified scan line represents the light gray color, the specified scan line is located at the boundary of the second region 22 adjacent to the fourth region 24 (Step S34). In other words, the specified scan line is the first scan line from the second region 22. Whereas, if the judging condition of the step S33 is not satisfied, the step S32 is performed again to repeat the searching procedure.

It is noted that the specified backward length and the predetermined scan length may be varied according to the practical requirements. That is, the specified backward length and the predetermined scan length are not restricted to their maximum values. It is noted that numerous modifications and alterations may be made while retaining the teachings of the invention. For example, if the judging condition of the step S33 is not satisfied, the step S31 is performed again. However, the procedure of moving the optical module 10 backwardly is omitted, but the optical module 10 performs the additional scanning operation with the predetermined scan length for one time.

After the specified scan line is located at the boundary of the second region 22 adjacent to the fourth region 24, the step S35 and S36 are performed. Similarly, after the boundary of the second region 22 adjacent to the fourth region 24 related to a specified horizontal scan line of the additional scanned image is recognized, the position of the boundary in the additional scanned image is determined. After calculation, the actual position of the optical module 10 in the scanning platform 100 can be realized. Meanwhile, the linear distance between the optical module 10 and the boundary can be realized. Since the distance between the boundary and the initial position A1 is a known fixed value, the distance between the current position of the optical module 10 and the initial position A1 is also known. Consequently, the moving information is related to the distance between the current position of the optical module 10 and the initial position A1. According to the moving information, the optical module 10 is driven to be accurately moved back to the initial position A1.

As mentioned above, the initial position A1 is located at a side of the third region 23 that is the closest to the casing 20, and the second region 22 is farther from the initial position A1. The optical module 10 may collide with the casing 20 under the long-distance accelerated movement. For solving the above drawbacks, the step S36 can be further modified.

For example, in another embodiment, the optical module 10 is moved to the first region 21 and stayed in the first region 21. Under this circumstance, the moving information is related to the distance of moving the optical module 10 to the first region 21. Then, the flowchart of FIG. 2 and the flowchart of FIG. 4 are performed again, and thus the optical module 10 is moved back to the initial position A1. Due to the stepwise movement, the collision between the optical module 10 and the casing 20 is avoided.

Figure 6:
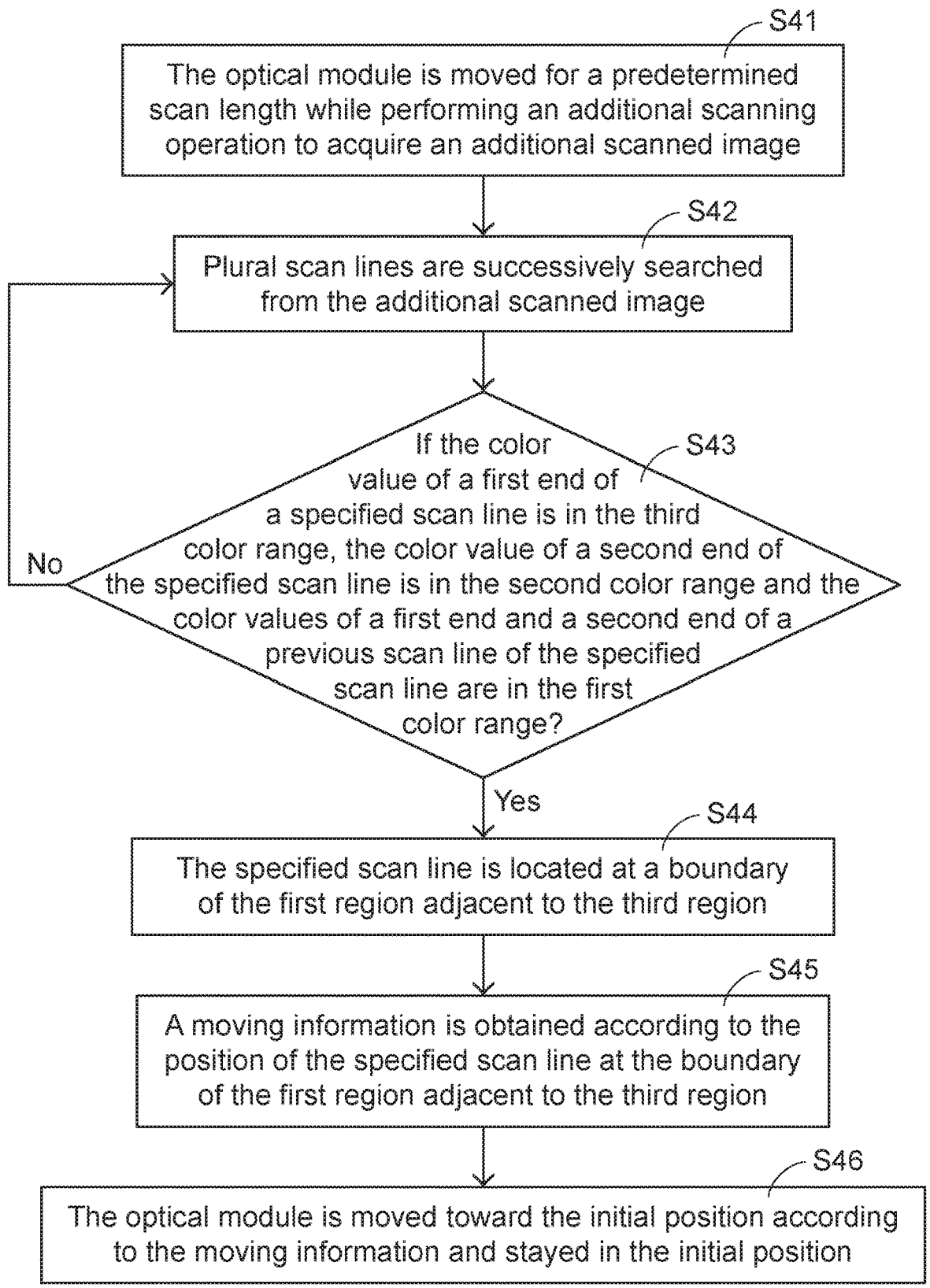
FIG. 6 is a flowchart illustrating the optical module positioning method of the present invention after the optical module is determined to be stayed in the third region.

FIG. 6 is a flowchart illustrating the optical module positioning method of the present invention after the optical module is determined to be stayed in the third region. Firstly, the optical module 10 is moved for a predetermined scan length while performing an additional scanning operation to acquire an additional scanned image (Step S41). Then, plural scan lines are successively searched from the additional scanned image (Step S42). Then, a step S43 is performed to judge whether the color value of a first end of a specified scan line is in the third color range, the color value of a second end of the specified scan line is in the second color range and the color values of a first end and a second end of a previous scan line of the specified scan line are in the first color range. If the judging condition of the step S43 is satisfied, it is determined that the specified scan line is located at a boundary of the first region 21 adjacent to the third region 23 (Step S44). Then, a moving information is obtained according to the position of the specified scan line at the boundary of the first region 21 adjacent to the third region 23 (Step S45). Then, the optical module 10 is moved toward the initial position A1 according to the moving information and stayed in the initial position A1 (Step S46).

The flowchart of FIG. 6 is designed to search the junction between the first region 21 and the third region 23, especially the junction between the first region 21 and the separation part 34. After the first region 21 is searched, the optical module 10 can be moved to the initial position A1 according to the main characteristic chart 211 or the plural minor characteristic charts 212. Particularly, the line passing through the topmost edges of the first characteristic chart 31 and the second characteristic chart 32 represents the junction between the first region 21 and the separation part 34. As mentioned above, the first characteristic chart 31 has a black color, the second characteristic chart 32 has the white color, and the separation part 34 on the upper side of the first region 21 has the dark gray color. In other words, the junction can be recognized according to the color difference. After the junction between the first region 21 and the third region 23 is searched, the junction between the first characteristic chart 31 and the separation part 34 on the upper side can be searched.

In the step S41, the optical module 10 is driven to be moved for the predetermined scan length along the Y direction as shown in FIG. 1. That is, the moving action and the scanning operation of the optical module 10 are simultaneously performed. According to the settings of this embodiment, the maximum of the predetermined scan length is equal to a total length of the third region 23 and the first region 21. For example, the predetermined scan length is equal to a total length of the third region 23 and the first region 21, and the optical module 10 is moved for the predetermined scan length to perform the additional scanning operation. Even if the optical module 10 is located at the topmost initial position A1 in the beginning, the junction between the first characteristic chart 31 and the separation part 34 on the upper side of the first characteristic chart 31 is still contained in the additional scanned image. In other words, the junction between the first region 21, the second characteristic chart 32 and the separation part 34 on the upper side of the second characteristic chart 32 is still contained in the additional scanned image. In addition, the pixel averaging method can be used to process the additional scanned image.

The steps S42~S46 are similar to the steps S32~S36 in the flowchart of FIG. 5. In contrast, the flowchart of FIG. 6 performs the associated judgment according to the first color range, the second color range and the third color range. If the judging result indicates that the color value of the first end (i.e., the left end) of the specified scan line represents the black color, the color value of the second end (i.e., the right end) of the specified scan line represents the white color and the color values of the first end (i.e., the left end) and the second end (i.e., the right end) of the previous scan line of the specified scan line represents the dark gray color, the specified scan line is located at the boundary of the first region 21 adjacent to the third region 23. Similarly, after the position of the boundary in the additional scanned image is determined, the linear distance between the optical module 10 and the boundary can be realized. Moreover, since the distance between the boundary and the initial position A1 is a known fixed value, the moving information related to the distance between the current position of the optical module 10 and the initial position A1 can be calculated. According to the moving information, the optical module 10 is driven to be accurately moved back to the initial position A1.

This embodiment can be further modified. For example, in another embodiment, the optical module 10 is moved to the first region 21 and stayed in the first region 21. Then, the flowchart of FIG. 2 and the flowchart of FIG. 4 are performed again, and thus the optical module 10 is moved back to the initial position A1.

Figure 7:
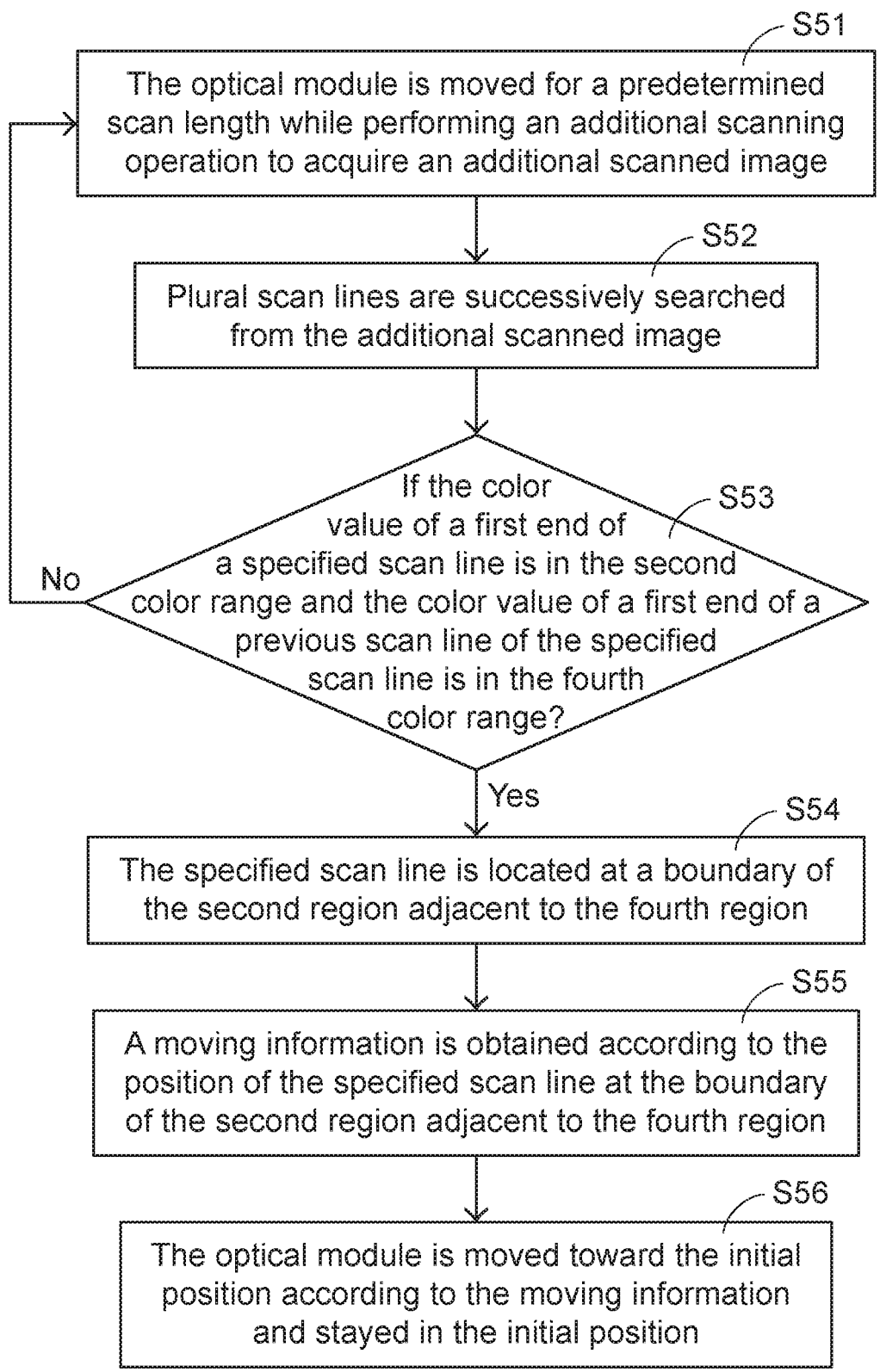
FIG. 7 is a flowchart illustrating the optical module positioning method of the present invention after the optical module is determined to be stayed in the fourth region.

FIG. 7 is a flowchart illustrating the optical module positioning method of the present invention after the optical module is determined to be stayed in the fourth region. Firstly, the optical module 10 is moved for a predetermined scan length while performing an additional scanning operation to acquire an additional scanned image (Step S51). Then, plural scan lines are successively searched from the additional scanned image (Step S52). Then, a step S53 is performed to judge whether the color value of a first end of a specified scan line is in the second color range and the color value of a first end of a previous scan line of the specified scan line is in the fourth color range. If the judging condition of the step S53 is satisfied, it is determined that the specified scan line is located at a boundary of the second region 22 adjacent to the fourth region 24 (Step S54). Then, a moving information is obtained according to the position of the specified scan line at the boundary of the second region 22 adjacent to the fourth region 24 (Step S55). Then, the optical module 10 is moved toward the initial position A1 according to the moving information and stayed in the initial position A1 (Step S56).

The flowchart of FIG. 7 is designed to search the junction between the second region 22 and the fourth region 24. Like the example of FIG. 5, the junction between the second region 22 and the fourth region 24 is searched by recognizing the color different in the junction. As mentioned above, the third characteristic chart 33 has a white color, and the casing 20 corresponding to the left end of the fourth region 24 has the light gray color. After the junction between the third characteristic chart 33 and the casing 20 on the upper side of the third characteristic chart 33 is recognized, the junction between the second region 22 and the fourth region 24 is searched.

When compared with the flowchart of FIG. 5, the flowchart of FIG. 7 only has the following difference. In the beginning of the flowchart of FIG. 7, the optical module 10 is stayed in the fourth region 24. In the step S51, the optical module 10 is directly driven to be moved for the predetermined scan length along the Y direction as shown in FIG. 1 without the need of moving backwardly. According to the settings of this embodiment, the maximum of the predetermined scan length is equal to a total length of the third region 23 and the first region 21. As shown in FIG. 1, the fourth region 24 is the longest among the four regions. In an embodiment, the total length of the third region 23 and the first region 21 is appropriately one third of the length of the fourth region 24. If the optical module 10 is located at the topmost side of the fourth region 24 (i.e., the position adjacent to the first region 21), the junction between the third characteristic chart 33 and the casing 20 on the upper side of the third characteristic chart 33 is not contained in the additional scanned image that is acquired through a single moving and scanning operation of the optical module 10.

If the judging condition of the step S53 is not satisfied, the step S51 is performed again. That is, the optical module 10 performs an additional scanning operation with the predetermined scan length to acquire a new additional scanned image, and the new additional scanned image is subjected to the searching and judging procedures again. In case that the predetermined scan length is equal to a total length of the third region 23 and the first region 21, and the optical module 10 is moved for the predetermined scan length to perform the additional scanning operation, the third characteristic chart 33 can be scanned by the optical module 10 after the optical module 10 is moved in the fourth region 24 for at most three times. That is, the optical module 10 can be moved to the junction between the second region 22 and the fourth region 24.

The subsequent steps are similar to the corresponding steps of the flowchart of FIG. 5. For example, the moving information is obtained according to the position of the specified scan line at the boundary, and the optical module 10 is moved to the initial position A1 or sequentially moved to the first region 21 and the initial position A1. However, in case that the boundary is located at an edge of the additional scanned image, the boundary cannot be clearly recognized. For solving this drawback, the optical module positioning method can be further modified. For example, after the optical module 10 is moved from the fourth region 24 to the second region 22, the steps of the flowchart as shown in FIG. 5 are performed. That is, after the optical module 10 is moved backwardly to the fourth region 24, the optical module 10 is moved forwardly to perform an additional scanning operation. Due to this design, the optical module 10 stayed in the fourth region 24 in the beginning can be moved back to the initial position A1 after the optical module 10 is moved for at most six times.

From the above descriptions, the present invention provides an optical module positioning method. When the optical module positioning method is applied to an image processing device such as a multifunction peripheral, the image processing device can realize the stayed region of the optical module on the scanning platform according to color recognition without the need of moving the optical module. Since the image processing device is not equipped with the sensing element, the fabricating cost is effectively reduced. Moreover, the distance of moving the optical module back to the initial position can be accurately calculated according to the position of the boundary of associated characteristic chart in the scanned image. Not only the image processing device is not equipped with the sensing element, the collision between the optical module and the casing is avoided. Consequently, the possibility of resulting in damage of the optical module is effectively reduced.

Consequently, the optical module positioning method of the present invention is capable of effectively overcoming the drawbacks of the conventional technologies and achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An optical module positioning method for an image processing device, the image processing device comprising a scanning platform and an optical module, the scanning platform comprising a first region, a second region, a third region and a fourth region, the fourth region being arranged between the first region and the second region, the first region being arranged between the third region and the fourth region, an initial position being included in the third region, a length of the fourth region being larger than a length of the third region, the optical module positioning method comprising steps of:

driving the optical module to perform a scanning operation to acquire a scanned image while the optical module is not moved;

if a color value of a first end of the scanned image and a color value of a second end of the scanned image are in a first color range or a second color range, determining that the optical module is stayed in the third region;

if the color value of the first end of the scanned image is in a third color range and the color value of the second end of the scanned image is in the second color range, determining that the optical module is stayed in the first region;

if the color value of the first end of the scanned image is in the second color range and the color value of the second end of the scanned image is in a fourth color range, determining that the optical module is stayed in the second region; and if the color value of the first end of the scanned image and the color value of the second end of the scanned image are in the fourth color range, determining that the optical module is stayed in the fourth region.

2. The optical module positioning method according to claim 1, wherein the initial position is located at a first side of the third region, and a scanning width of the optical module is equal to a width of each of the first region, the second region, the third region and the fourth region.

3. The optical module positioning method according to claim 1, wherein the scanning platform further comprises a first scanning glass plate and a second scanning glass plate, wherein the first scanning glass plate is aligned with the third region and an automatic document feeder of the image processing device, and the second scanning glass plate is aligned with the fourth region and the second region, wherein a scanning width of the optical module is equal to a width of the first scanning glass plate, and the scanning width of the optical module is larger than a width of the second scanning glass plate.

4. The optical module positioning method according to claim 3, wherein the scanning platform further comprises a casing, a separation part, a first characteristic chart, a second characteristic chart and a third characteristic chart, and the image processing device further comprises a document press chart, wherein the first scanning glass plate and the second scanning glass plate are enclosed by the casing, and the separation part is arranged between the first scanning glass plate and the first region, wherein the first characteristic chart, the second characteristic chart and the third characteristic chart are formed on the casing, the first characteristic chart and the second characteristic chart are respectively formed located at two ends of the first region, the third characteristic chart is located at an end of the second region, and the document press chart is located over the first scanning glass plate.

5. The optical module positioning method according to claim 4, wherein a color value of each of the document press chart, the second characteristic chart and the third characteristic chart is in the second color range, a color value of the first characteristic chart is in the third color range, a color value of the separation part is in the first color range, and a color value of the casing is in the fourth color range.

6. The optical module positioning method according to claim 4, wherein the second characteristic chart and the third characteristic chart are diagonally arranged at two opposite sides.

7. The optical module positioning method according to claim 4, wherein the document press chart is installed on a top cover of the image processing device, and a size of the document press chart matches a size of the first scanning glass plate.

8. The optical module positioning method according to claim 1, wherein the first region contains a main characteristic chart and plural minor characteristic charts, wherein the main characteristic chart and the plural minor characteristic charts are located at a side of the first region adjacent to the fourth region, wherein the main characteristic chart has a main characteristic width, and each of the minor characteristic charts has a minor characteristic width.

9. The optical module positioning method according to claim 8, wherein after the optical module is determined to be stayed in the first region, the optical module positioning method further comprises steps of:
    successively searching plural scan lines from the scanned image;
    if a color value of first-portion pixels in a specified scan line of the plural scan lines is in the third color range and a color value of second-portion pixels on two sides of the first-portion pixels is in the second color range, generating a block width corresponding to the first-portion pixels; and
    judging whether the block width matches the main characteristic width or one of the plural minor characteristic widths, wherein if the block width matches the main characteristic width, a position of the main characteristic chart in the scanned image is determined, wherein if the block width matches one of the plural minor characteristic widths, a position of the corresponding minor characteristic chart in the scanned image is determined.

10. The optical module positioning method according to claim 9, further comprising steps of:
    obtaining a moving information according to the position of the main characteristic chart or the position of the corresponding minor characteristic chart in the scanned image; and
    driving the optical module to be moved toward the initial position according to the moving information and stayed in the initial position.

11. The optical module positioning method according to claim 1, wherein after the optical module is determined to be stayed in the second region, the optical module positioning method further comprises steps of:
    driving the optical module to be moved toward the initial position for a specified backward length, and then driving the optical module to be moved for a predetermined scan length while performing an additional scanning operation to acquire an additional scanned image;
    successively searching plural scan lines from the additional scanned image; and
    if a color value of a first end of a specified scan line of the plural scan lines is in the second color range and a color value of a first end of a previous scan line of the specified scan line is in the fourth color range, determining that the specified scan line is located at a boundary of the second region adjacent to the fourth region.

12. The optical module positioning method according to claim 11, wherein a maximum of the backward length is equal to a length of the second region, and a maximum of the predetermined scan length is equal to a total length of the third region and the first region.

13. The optical module positioning method according to claim 11, wherein the additional scanned image is processed by using a pixel averaging method.

14. The optical module positioning method according to claim 11, further comprising steps of:
    obtaining a moving information according to a position of the specified scan line at the boundary of the second region adjacent to the fourth region; and
    driving the optical module to be moved toward the initial position according to the moving information and stayed in the first region or the initial position.

15. The optical module positioning method according to claim 1, wherein after the optical module is determined to be stayed in the third region, the optical module positioning method further comprises steps of:
    driving the optical module to be moved for a predetermined scan length while performing an additional scanning operation to acquire an additional scanned image;
    successively searching plural scan lines from the additional scanned image; and
    if a color value of a first end of a specified scan line of the plural scan lines is in the third color range, a color value of a second end of the specified scan line is in the second color range and color values of a first end and a second end of a previous scan line of the specified scan line are in the first color range, determining that the specified scan line is located at a boundary of the first region adjacent to the third region.

16. The optical module positioning method according to claim 15, wherein a maximum of the predetermined scan length is equal to a total length of the third region and the first region.

17. The optical module positioning method according to claim 15, wherein the additional scanned image is processed by using a pixel averaging method.

18. The optical module positioning method according to claim 15, further comprising steps of:
    obtaining a moving information according to a position of the specified scan line at the boundary of the first region adjacent to the third region; and
    driving the optical module to be moved toward the initial position according to the moving information and stayed in the first region or the initial position.

19. The optical module positioning method according to claim 1, wherein after the optical module is determined to be stayed in the fourth region, the optical module positioning method further comprises steps of:

driving the optical module to be moved for a predetermined scan length while performing an additional scanning operation to acquire an additional scanned image;

successively searching plural scan lines from the additional scanned image; and if a color value of a first end of a specified scan line of the plural scan lines is in the second color range and a color value of a first end of a previous scan line of the specified scan line is in the fourth color range, determining that the specified scan line is located at a boundary of the second region adjacent to the fourth region.

20. The optical module positioning method according to claim 19, wherein a maximum of the predetermined scan length is equal to a total length of the third region and the first region.

21. The optical module positioning method according to claim 19, wherein the additional scanned image is processed by using a pixel averaging method.

22. The optical module positioning method according to claim 19, further comprising steps of:

obtaining a moving information according to a position of the specified scan line at the boundary of the second region adjacent to the fourth region; and driving the optical module to be moved toward the initial position according to the moving information and stayed in the first region or the initial position.

* * * * *